US012770034B2

(12) United States Patent
Sbodio et al.

(10) Patent No.: US 12,770,034 B2
(45) Date of Patent: Oct. 20, 2026

(54) ACCURACY EVALUATION OF CONCEPT EXPANSION SYSTEMS

(71) Applicant: International Business Machines Corporation, Armonk, NY (US)

(72) Inventors: Marco Luca Sbodio, Dublin (IE); Natalia Mulligan, Dublin (IE); Joao H. Bettencourt-Silva, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 18/334,108

(22) Filed: Jun. 13, 2023

(65) Prior Publication Data

US 2024/0419987 A1 Dec. 19, 2024

(51) Int. Cl.
*G06N 5/04* (2023.01)

(52) U.S. Cl.
CPC .................................... *G06N 5/04* (2013.01)

(58) Field of Classification Search
CPC ................................................ G06N 5/04
See application file for complete search history.

(56) References Cited

U.S. PATENT DOCUMENTS 11,295,861 B2 4/2022 Hasan et al.

FOREIGN PATENT DOCUMENTS

| | | |
|---|---|---|
| CN | 103150382 B | 4/2015 |
| CN | 113076411 B | 6/2022 |
| CN | 115062622 A | 9/2022 |

OTHER PUBLICATIONS

Rivas, Andreia Rodriguez, Eva Lorenzo Iglesias, and L. Borrajo. "Study of query expansion techniques and their application in the biomedical information retrieval." The Scientific World Journal Jan. 2014 (2014): 132158. (Year: 2014).*

Zeng, Qing T., et al. "Synonym, topic model and predicate-based query expansion for retrieving clinical documents." AMIA Annual Symposium Proceedings. vol. 2012. 2012. (Year: 2012).*

Kholghi, Mahnoosh, et al. "Active learning: a step towards automating medical concept extraction." Journal of the American Medical Informatics Association 23.2 (2016): 289-296. (Year: 2016).*

El-Hasnony, Ibrahim M., et al. "Multi-label active learning-based machine learning model for heart disease prediction." Sensors 22.3 (2022): 1184. (Year: 2022).*

(Continued)

*Primary Examiner* — Shahid K Khan
(74) *Attorney, Agent, or Firm* — Yee & Associates, P.C.

(57) ABSTRACT

Accuracy evaluation of concept expansion systems is provided. A returned set of related concepts corresponding to a test set of concepts is received from a concept expansion system. A comparison is performed between an expected set of concepts and the returned set of related concepts corresponding to the test set of concepts to identify intersection. An accuracy metric corresponding to the concept expansion system is generated based on the intersection between the expected set of concepts and the returned set of related concepts corresponding to the test set of concepts. It is determined whether the accuracy metric is greater than a minimum accuracy threshold level. A set of action steps is performed in response to determining that the accuracy metric is not greater than the minimum accuracy threshold level.

14 Claims, 10 Drawing Sheets

(56) References Cited

OTHER PUBLICATIONS

Gissin, Daniel, and Shai Shalev-Shwartz. “Discriminative active learning.” arXiv preprint arXiv:1907.06347 (2019). (Year: 2019).*
Schröder, Christopher, and Andreas Niekler. “A survey of active learning for text classification using deep neural networks.” arXiv preprint arXiv:2008.07267 (2020). (Year: 2020).*
“Assessment of Detection and Recognition of Entities and Relations Within and Across Documents,” Automatic Content Extraction (ACE) 2008 Evaluation Plan (ACE08), Aug. 8, 2008, 16 pages. https://my.eng.utah.edu/~cs6961/papers/ACE-2008-description.pdf.
“Scorer,” spaCy API Documentation, copyright Explosion 2016-2023, accessed Jun. 7, 2023, 16 pages. https://spacy.io/api/scorer.
“Top-level Functions,” spaCy API Documentation, copyright Explosion 2016-2023, accessed Jun. 7, 2023, 50 pages. https://spacy.io/api/top-level.
Stackoverflow, “Evaluation in a Spacy NER model,” copyright 2023 Stack Exchange Inc, accessed Jun. 7, 2023, 5 pages. https://stackoverflow.com/questions/44827930/evaluation-in-a-spacy-ner-model/44841535#44841535.
Stackoverflow, “is there a way with spaCy’s NER to calculate metrics per entity type?,” copyright 2023 Stack Exchange Inc, accessed Jun. 7, 2023, 6 pages. https://stackoverflow.com/questions/52856057/is-there-a-way-with-spacys-ner-to-calculate-metrics-per-entity-type.
Wang et al., “CrossWeigh: Training Named Entity Tagger from Imperfect Annotations,” Proceedings of the 2019 Conference on Empirical Methods in Natural Language Processing and the 9th International Joint Conference on Natural Language Processing, Hong Kong, China, Nov. 3-7, 2019, 10 pages. https://aclanthology.org/D19-1519.pdf.
No Author, “Unified Medical Language System (UMLS)”, https://web.archive.org/web/20250919162734/https://www.nlm.nih.gov/research/umls/index.html, Sep. 19, 2025, 4 pages.

* cited by examiner

ACCURACY EVALUATION OF CONCEPT EXPANSION SYSTEMS

BACKGROUND

The disclosure relates generally to concept expansion and more specifically to accuracy evaluation of concept expansion systems.

Concept expansion is the process of broadening or extending the scope and understanding of a particular concept. Concept expansion involves exploring related ideas, subtopics, and connections to gain a more comprehensive perspective on a particular concept. In other words, concept expansion extends the range or applicability of a concept within its domain. Concept expansion can be applied in various fields, such as, for example, research, education, problem-solving, mathematics, physics, philosophy, linguistics, creative thinking, natural language processing, and the like.

A concept expansion system is a computational or AI-based framework designed to facilitate the process of expanding and exploring concepts. Typically, the concept expansion system utilizes algorithms and techniques to assist individuals in broadening their understanding, generating new ideas, and discovering connections within a given domain. For example, a concept expansion system can take a set of text as input and generate a set of concepts that are used to enrich the set of text.

SUMMARY

According to one illustrative embodiment, a computer-implemented method for accuracy evaluation of concept expansion systems is provided. A computer receives a returned set of related concepts corresponding to a test set of concepts from a concept expansion system. The computer performs a comparison between an expected set of concepts and the returned set of related concepts corresponding to the test set of concepts to identify intersection. The computer generates an accuracy metric corresponding to the concept expansion system based on the intersection between the expected set of concepts and the returned set of related concepts corresponding to the test set of concepts. The computer determines whether the accuracy metric is greater than a minimum accuracy threshold level. The computer performs a set of action steps in response to the computer determining that the accuracy metric is not greater than the minimum accuracy threshold level. According to other illustrative embodiments, a computer system and computer program product for accuracy evaluation of concept expansion systems are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
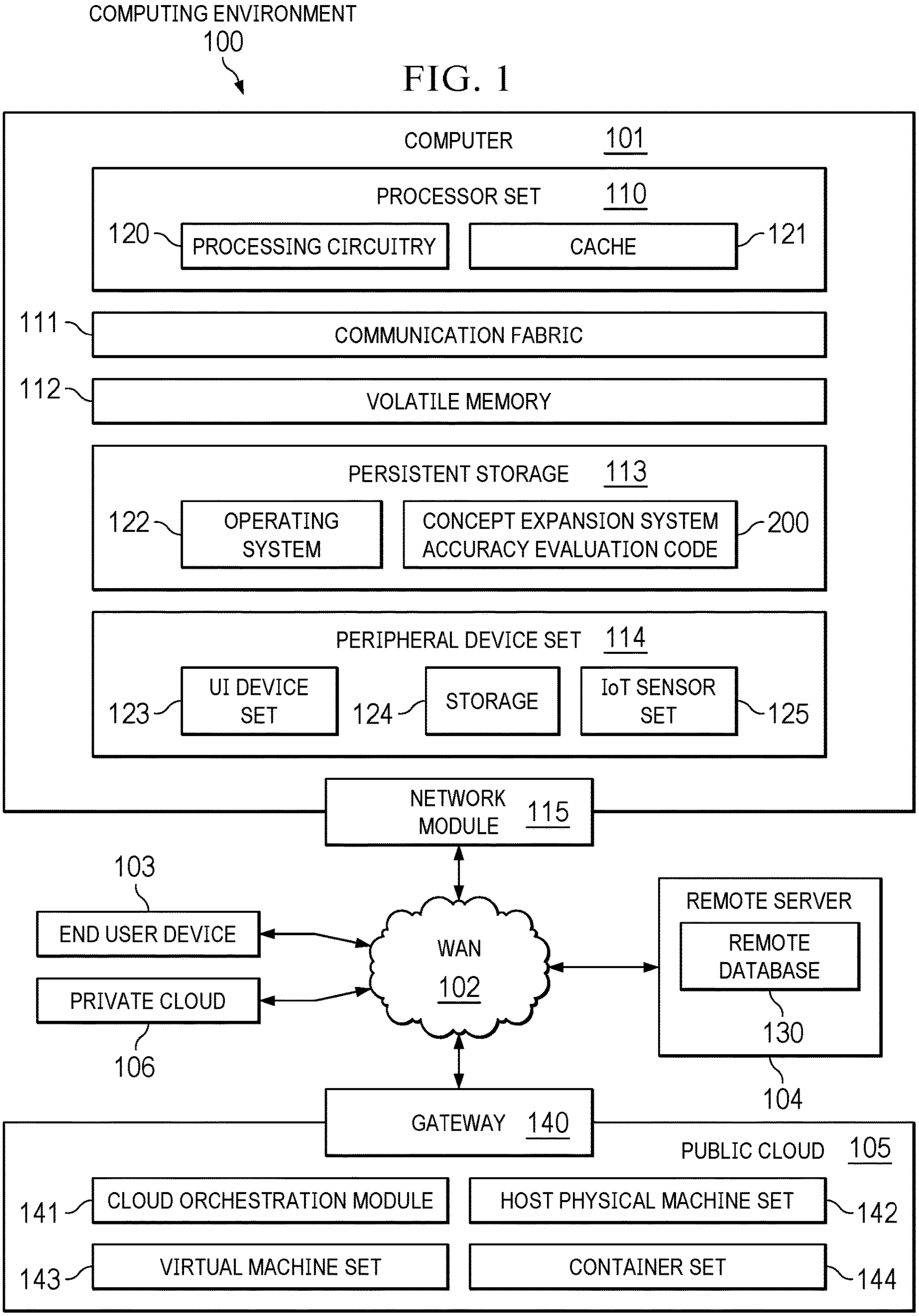
FIG. 1 is a pictorial representation of a computing environment in which illustrative embodiments may be implemented.
Figure 2:
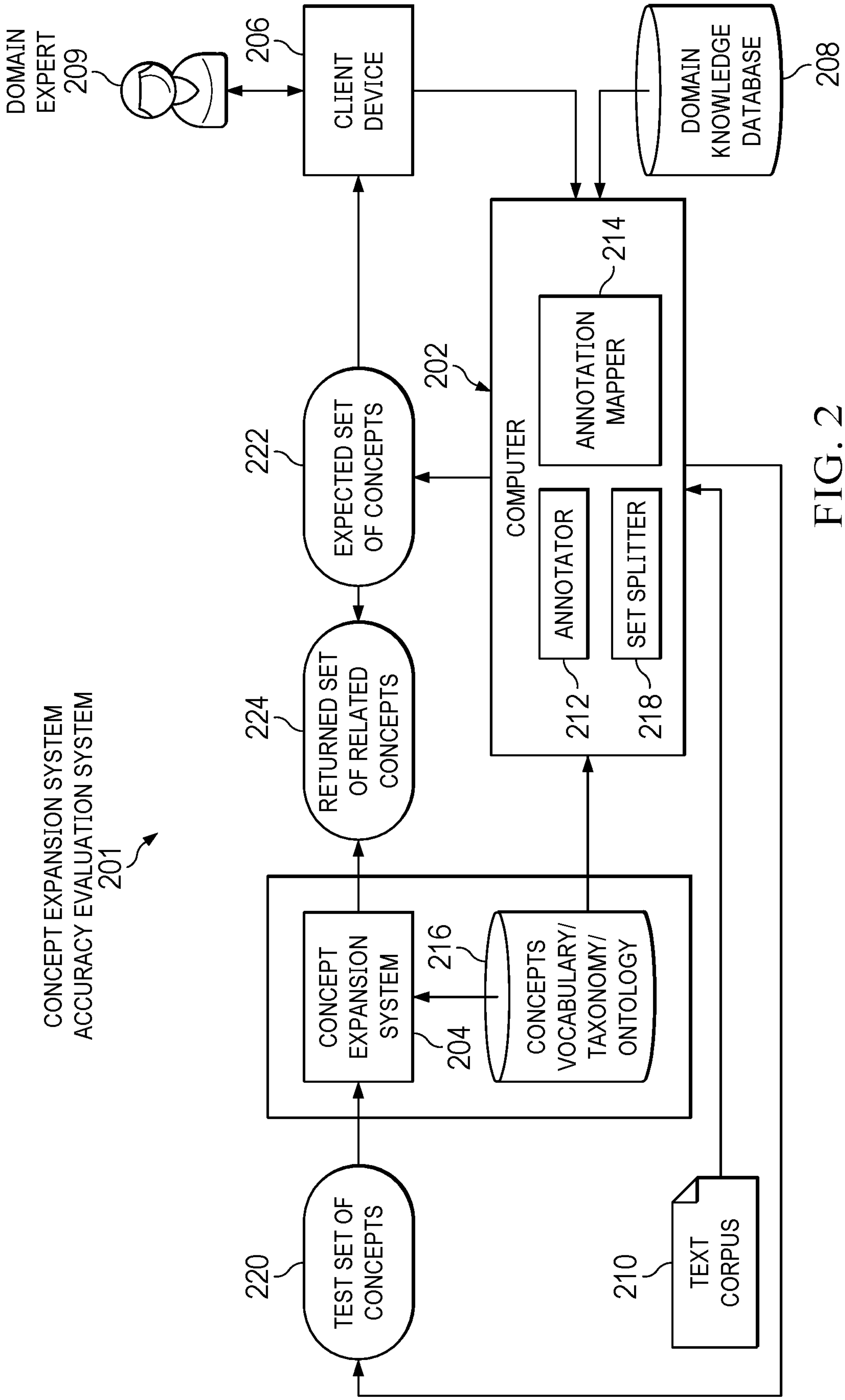
FIG. 2 is a diagram illustrating an example of a concept expansion system accuracy evaluation system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as concept expansion system accuracy evaluation code 200. For example, concept expansion system accuracy evaluation code 200 automatically generates a test dataset of concepts and an expected dataset of concepts based on a corpus of text from a particular domain to evaluate the accuracy of a given concept expansion system.

In addition to concept expansion system accuracy evaluation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and concept expansion system accuracy evaluation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in concept expansion system accuracy evaluation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The concept expansion system accuracy evaluation code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses, smart watches, or the like), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a domain expert using the concept expansion system accuracy evaluation services provided by computer 101), and may take any of the forms discussed above in connection with computer 101. EUD 103 typically receives helpful and useful data from the operations of computer 101. For example, in a hypothetical case where computer 101 is designed to provide a concept expansion system accuracy evaluation to the end user, this evaluation would typically be communicated from network module 115 of computer 101 through WAN 102 to EUD 103. In this way, EUD 103 can display, or otherwise present, the evaluation to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an accuracy evaluation of concept expansion systems based, at least in part, on domain data, then this domain data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Concept expansion systems are used in several domains and for different applications, including question answering systems, chatbots, recommender systems, and the like. Typically, a concept expansion system receives as input a set of concepts (e.g., emphysema, shortness of breath, and the like) and augments the set of concepts with related concepts (e.g., respiratory problems, chronic obstructive pulmonary disease, and the like).

Evaluating the accuracy of a concept expansion system (e.g., how accurate are the related concepts returned by the concept expansion system) is often problematic because of the lack of test datasets that are compatible with the concept expansion system, itself. Building such test datasets is a manual labor-intensive process that is not cost-efficient.

Illustrative embodiments automate the process of building a test dataset and an expected dataset to evaluate the accuracy of a given concept expansion system using a corpus of text (e.g., set of sentences, set of paragraphs, set of documents, set of books, or the like) from a particular domain, such as, for example, a healthcare domain, a financial domain, a banking domain, insurance domain, an educational domain, business domain, government domain, environmental domain, or the like. In other words, illustrative embodiments automatically transform the text corpus into a test dataset and expected dataset to evaluate the accuracy of that particular concept expansion system without requiring manual labelling.

Illustrative embodiments utilize an annotator, which corresponds to a particular domain (e.g., medical domain), to annotate text of a text corpus (e.g., medical records) corresponding to that particular domain. Alternatively, illustrative embodiments can utilize a general annotator that is not domain specific or task specific to annotate the text of the text corpus. Illustrative embodiments extract the annotated text from the text corpus. Illustrative embodiments map the extracted annotated text to a set of concepts used by a particular concept expansion system, which illustrative embodiments are evaluating for accuracy, to obtain a set of compatible concepts that are compatible with that particular concept expansion system. As used herein, compatible means that illustrative embodiments can utilize the set of compatible concepts as input to that particular concept expansion system. Typically, the set of concepts (e.g., vocabulary, taxonomy, or ontology of concepts) used by that particular concept expansion system is available to illustrative embodiments by analyzing the specification of that particular concept expansion system. Alternatively, illustrative embodiments can reconstruct the set of concepts via reconstruction by querying the concept expansion system or by reverse engineering.

The mapping process of one illustrative embodiment includes, for example, using an existing annotator "A" to annotate the concepts used by that particular concept expansion system to obtain a first set of annotations "A_V". The illustrative embodiment utilizes the same annotator A to annotate an input text corpus to obtain a second set of annotations "A_T". The illustrative embodiment identifies any sequence of annotations in the second set of annotations A_T that partially or fully matches a sequence of annotations in the first set of annotations A_V. The illustrative embodiment identifies such a match as (A_T_i, A_V_j), where A_T_i belongs to A_T and A_V_j belongs to A_V. For each annotation match (A_T_i, A_V_j), the illustrative embodiment computes a matching score. The illustrative embodiment keeps those annotation matches having a corresponding matching score greater than a defined minimum matching score threshold level. The illustrative embodiment then utilizes those annotation matches to generate the set of compatible concepts that are compatible with that particular concept expansion system.

Illustrative embodiments then split the set of compatible concepts into a test set of concepts and an expected set of concepts using a splitting strategy. Illustrative embodiments input the test set of concepts into that particular concept expansion system. Subsequently, illustrative embodiments receive from that particular concept expansion system a returned set of related concepts corresponding to the test set of concepts input into that particular concept expansion system. Illustrative embodiments evaluate the accuracy of that particular concept expansion system by comparing the expected set of concepts with the returned set of related concepts corresponding to the test set of concepts to identify intersection between the two sets of concepts. Illustrative embodiments calculate accuracy metrics, such as, for example, precision, recall, F1-score, and the like, based on the identified intersection between the two sets of concepts.

Moreover, illustrative embodiments can receive as input a set of text corpuses {U1, U2, . . . Un} and compare the accuracy of that particular concept expansion system across {U1, U2, . . . Un}. Furthermore, illustrative embodiments can determine how the accuracy metrics (e.g., precision, recall, and F1-score) change for that particular concept expansion system when, for example, illustrative embodiments utilize a different annotator, different splitting strategy, or the like.

Thus, illustrative embodiments provide one or more technical solutions that overcome a technical problem with an inability of current solutions to generate a set of test concepts that is compatible as input into a particular concept expansion system to evaluate accuracy of that particular concept expansion system. As a result, these one or more technical solutions provide a technical effect and practical application in the field of concept expansion.

With reference now to FIG. 2, a diagram illustrating an example of a concept expansion system accuracy evaluation system is depicted in accordance with an illustrative embodiment. Concept expansion system accuracy evaluation system 201 may be implemented in a computing environment, such as computing environment 100 in FIG. 1. Concept expansion system accuracy evaluation system 201 is a system of hardware and software components for automatically generating a test set of concepts and an expected set of concepts based on a text corpus from a particular domain to evaluate the accuracy of a given concept expansion system.

In this example, concept expansion system accuracy evaluation system 201 includes computer 202, concept expansion system 204, client device 206, and domain knowledge database 208. Computer 202 may be, for example, computer 101 in FIG. 1. Concept expansion system 204 may be, for example, one of host physical machine set 142 in FIG. 1. Client device 206 may be, for example, EUD 103 in FIG. 1. Domain knowledge database 208 may be, for example, remote database 130 in FIG. 1. However, it should be noted that concept expansion system accuracy evaluation system 201 is intended as an example only and not as a limitation on illustrative embodiments. For example, concept expansion system accuracy evaluation system 201 can include any number of computers, concept expansion systems, client devices, domain knowledge databases, and other devices and components not shown.

Domain expert 209 inputs text corpus 210 into computer 202 using client device 206. Domain expert 209 is, for example, a subject matter expert regarding the domain corresponding to text corpus 210. Text corpus 210 can represent, for example, a sentence, paragraph, chapter, book, or the like.

In response to receiving text corpus 210, computer 202 utilizes annotator 212 to annotate the text of text corpus 210 and extract the annotated text from text corpus 210. Annotator 212 is an existing annotator that is trained using vocabulary of the domain (e.g., medical domain) corresponding to text corpus 210. Computer 202 then utilizes annotation mapper 214 to map the annotated text extracted from text corpus 210 to concepts 216, which are used by concept expansion system 204. It should be noted that annotation mapper 214 utilizes annotator 212 to annotate concepts 216 prior to performing the mapping. In addition, annotation mapper 214 can optionally utilize information contained in domain knowledge database 208 to assist in the mapping. Domain knowledge database 208 contains, for example, standard terminologies and/or ontologies corresponding to the domain of text corpus 210.

Based on the mapping between the annotated text extracted from text corpus 210 and concepts 216, annotation mapper 214 generates a set of compatible concepts that can be used as input to concept expansion system 204. Computer 202 utilizes set splitter 218 to divide or separate the set of compatible concepts, which is compatible with concept expansion system 204, into test set of concepts 220 and expected set of concepts 222. Set splitter 218 can utilize, for example, a default random sampling splitting strategy to divide the set of compatible concepts into the test set of concepts 220 and expected set of concepts 222 or any user-specified splitting strategy.

Computer 202 inputs test set of concepts 220 into concept expansion system 204. In response to receiving test set of concepts 220, concept expansion system 204 outputs returned set of related concepts 224, which corresponds to test set of concepts 220, to computer 202. Computer 202 then performs a comparison between expected set of concepts 222 and returned set of related concepts 224 corresponding to test set of concepts 220 to identify any intersection between expected set of concepts 222 and returned set of related concepts 224.

Based on any identified intersection between expected set of concepts 222 and returned set of related concepts 224, computer 202 calculates a set of accuracy metrics, such as, for example, precision, recall, F1-score, and the like, to evaluate the accuracy of concept expansion system 204. Computer 202 can output expected set of concepts 222 and the set accuracy metrics to client device 206 for review by domain expert 209.

Figure 3:
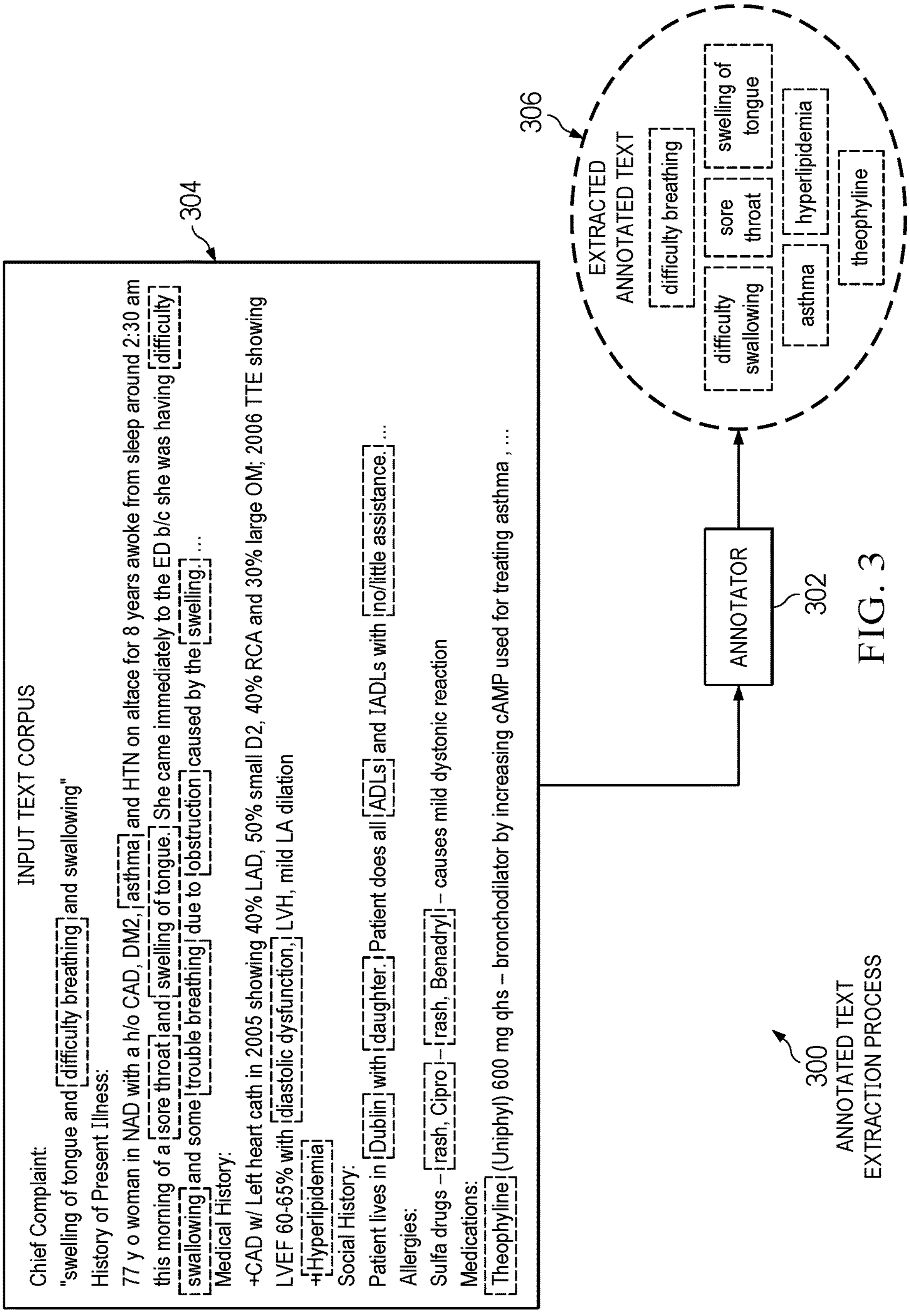
FIG. 3 is a diagram illustrating an example of an annotated text extraction process in accordance with an illustrative embodiment.

With reference now to FIG. 3, a diagram illustrating an example of an annotated text extraction process is depicted in accordance with an illustrative embodiment. Annotated text extraction process 300 can be implemented in a computer, such as, for example, computer 101 in FIG. 1 or computer 202 in FIG. 2.

In this example, the computer utilizes annotator 302, such as, for example, annotator 212 in FIG. 2, to analyze and annotate input text corpus 304. In this example, input text corpus 304 is medical text (i.e., a patient's medical record). Also, annotator 302 is trained using vocabulary of the medical domain. However, it should be noted that input text corpus 304 can be text from any domain and annotator 302 is trained on the vocabulary of that particular domain. After annotating input text corpus 304, annotator 302 extracts the annotated text from input text corpus 304 and outputs extracted annotated text 306 to an annotation mapper, such as, for example, annotation mapper 214 in FIG. 2.

Figure 4:
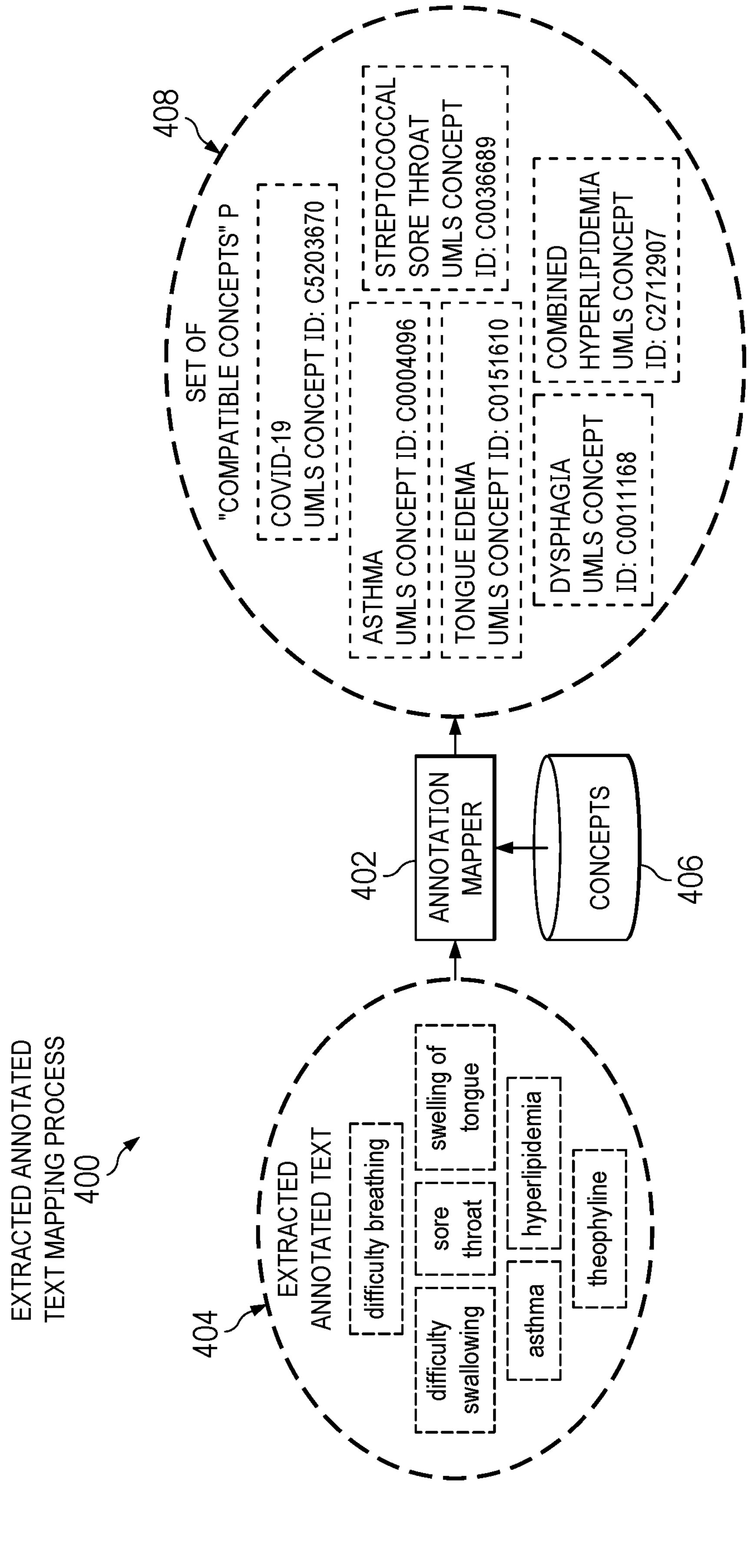
FIG. 4 is a diagram illustrating an example of an extracted annotated text mapping process in accordance with an illustrative embodiment.

With reference now to FIG. 4, a diagram illustrating an example of an extracted annotated text mapping process is depicted in accordance with an illustrative embodiment. Extracted annotated text mapping process 400 can be implemented in a computer, such as, for example, computer 101 in FIG. 1 or computer 202 in FIG. 2.

In this example, the computer utilizes annotation mapper 402, such as, for example, annotation mapper 214 in FIG. 2, to map extracted annotated text 404 to concepts 406 to obtain set of compatible concepts 408 that is compatible with a concept expansion system, such as, for example, concept expansion system 204 in FIG. 2. Extracted annotated text 404 may be, for example, extracted annotated text 306 in FIG. 3. Concepts 406 represent a set of concepts used by the concept expansion system and can be, for example, concepts 216 in FIG. 2. In this example, the vocabulary, taxonomy, or ontology of concepts 406 used by the concept expansion system is the Unified Medical Language System (UMLS) compendium of controlled vocabularies in the biomedical sciences.

Figure 5:
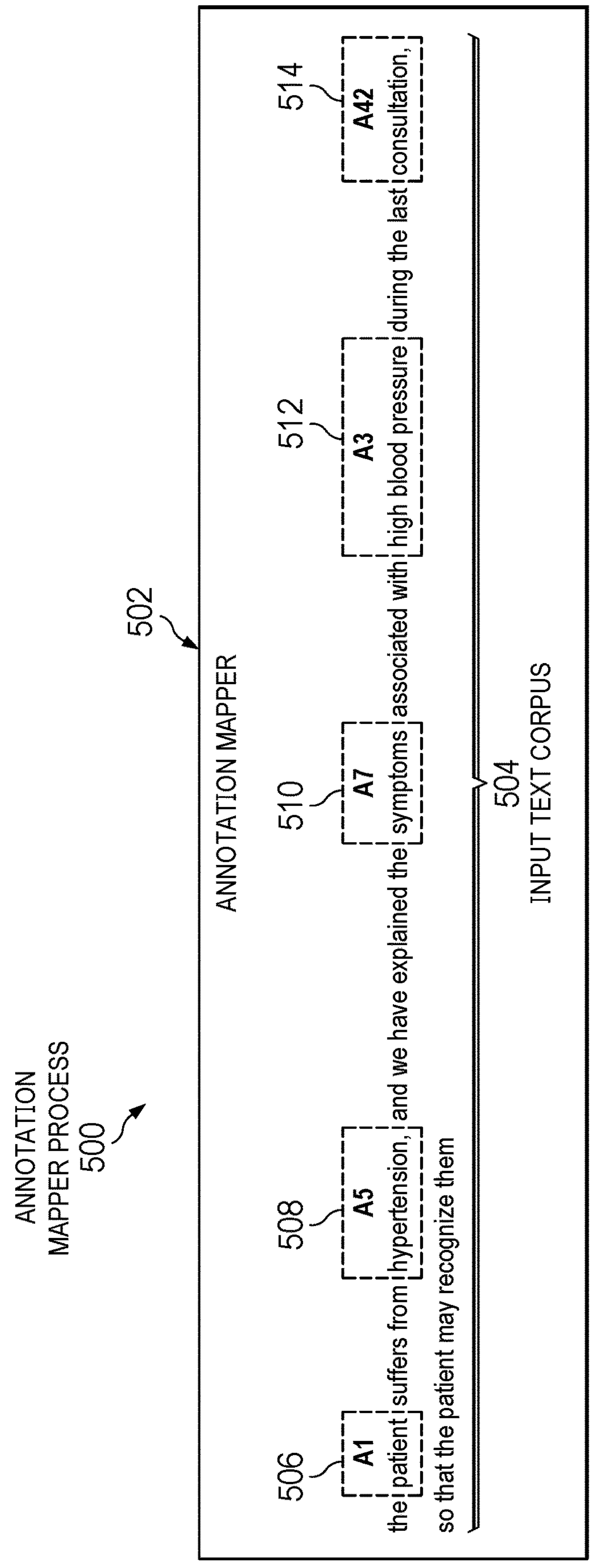
FIG. 5 is a diagram illustrating an example of an annotation mapper process in accordance with an illustrative embodiment.

With reference now to FIG. 5, a diagram illustrating an example of an annotation mapper process is depicted in accordance with an illustrative embodiment. Annotation mapper process 500 can be implemented in a computer, such as, for example, computer 101 in FIG. 1 or computer 202 in FIG. 2.

In this example, the computer utilizes annotation mapper 502, such as, for example, annotation mapper 214 in FIG. 2 or annotation mapper 402 in FIG. 4, to generate a set of compatible concepts, such as, for example, set of compatible concepts 408 in FIG. 4, which is compatible with the concept expansion system being evaluated for accuracy. For example, when annotating input text corpus 504 "the patient suffers from hypertension, and we have explained the symptoms associated with high blood pressure during the last consultation, so that the patient may recognize them", an annotator, such as, for example, annotator 212 in FIG. 2 or annotator 302 in FIG. 3, obtains the following set of annotated text: "patient" A1 506, "hypertension" A5 508, "symptoms" A7 510, "high blood pressure" A3 512, and "consultation" A42 514. It should be noted that annotation mapper 502 utilizes the same annotator that annotated input text corpus 504 to annotate the set of concepts, such as, for example, concepts 216 in FIG. 2 or concepts 406 in FIG. 4, used by the concept expansion system.

Annotation mapper 502 maps or associates a concept (e.g., "symptoms of high blood pressure") in the set of concepts used by the concept expansion system, with the set of annotated text (e.g., {"symptoms" A7 510, "high blood pressure" A3 512}). In other words, annotation mapper 502 tries to identify any sequence of annotated text within input text corpus 504 that matches one sequence of annotations corresponding to a concept in the set of concepts used by the concept expansion system. In this example, the sequence {"symptoms" A7 510, "high blood pressure" A3 512} in input text corpus 504 matches with the annotation of concept "symptoms of high blood pressure" in the set of concepts used by the concept expansion system.

In an alternative illustrative embodiment, annotation mapper 502 can store the sequences of annotations corresponding to the set of concepts used by the concept expansion system in the nodes of a trie data structure to make the matching process more efficient. A trie is a type of k-ary search tree data structure used for locating specific keys from within a set. These keys are most often strings with links between nodes defined not by the entire key, but by individual characters. In order to access a key (e.g., to recover its value), the trie is traversed depth-first, following the links between nodes, which represent each character in the key.

In another alternative embodiment, annotation mapper 502 can utilize domain knowledge (i.e., standard terminologies and/or ontologies corresponding to the domain of input text corpus 504) stored in a database, such as, for example, domain knowledge database 208 in FIG. 2, to improve the accuracy of generating the set of compatible concepts that is compatible the concept expansion system being evaluated for accuracy. Furthermore, annotation mapper 502 can generate a set of reports regarding the set of compatible concepts and collect feedback (e.g., validation data) from a domain expert, such as, for example, domain expert 209 in FIG. 2. The set of reports can include, for example, statistics on the set of compatible concepts (e.g., frequency distributions and the like), information regarding how the set of compatible concepts was generated (e.g., annotations or concepts used from domain knowledge), and provenance of the set of compatible concepts (e.g., where each concept was found in a fragment of input text corpus 504). The feedback received from the domain expert can include, for example, corrections to the set of compatible concepts.

In yet another alternative embodiment, annotation mapper 502 can initiate the interaction with the domain expert (e.g., sending the set of reports and collecting feedback) only when the set of compatible concepts does not meet some configurable quality criteria. The quality criteria can include, for example, a defined minimum number of concepts to be contained in the set of compatible concepts, frequency or TF-IDF (term frequency-inverse document frequency) of the set of compatible concepts, and the like.

Figure 6:
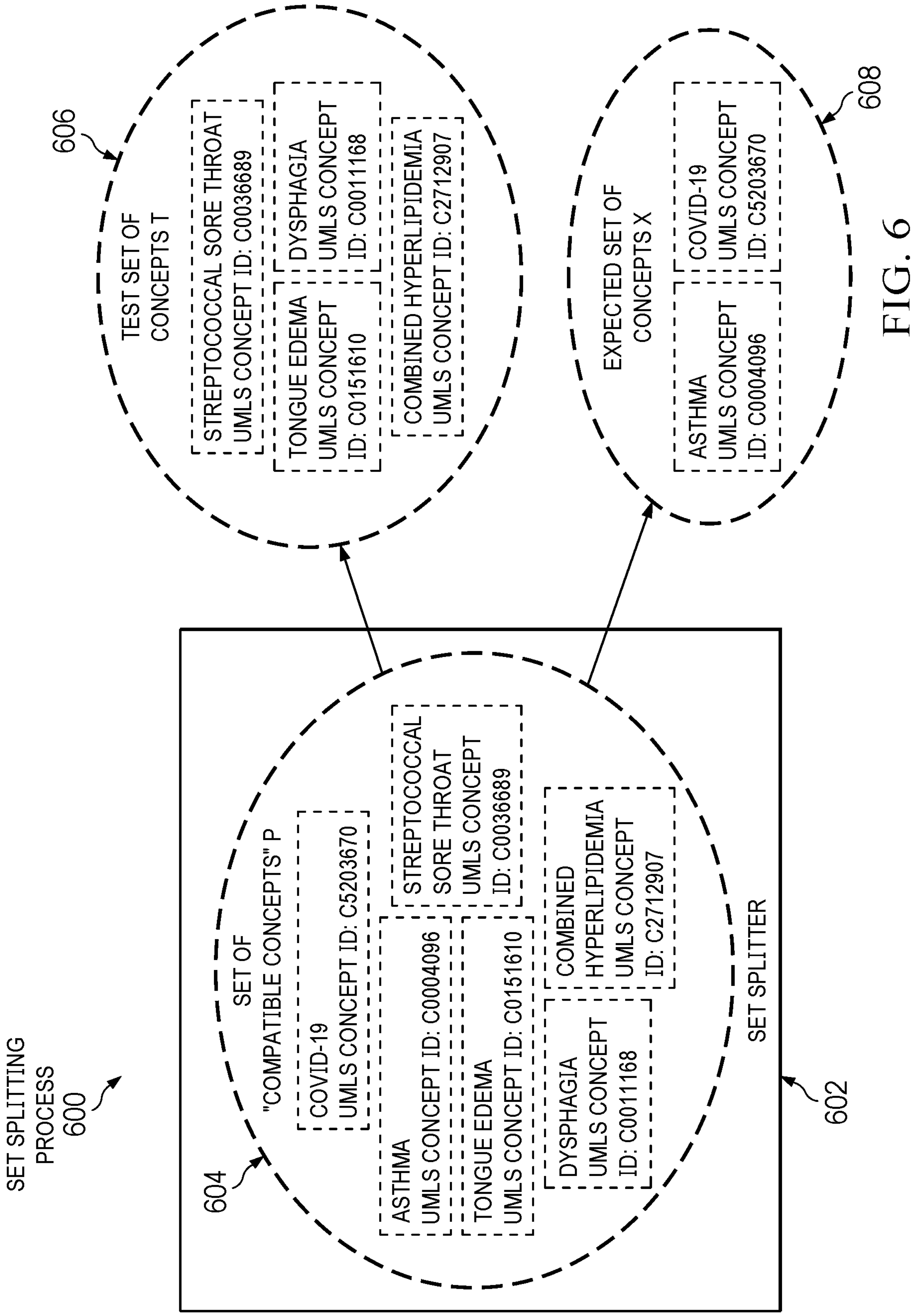
FIG. 6 is a diagram illustrating an example of a set splitting process in accordance with an illustrative embodiment.

With reference now to FIG. 6, a diagram illustrating an example of a set splitting process is depicted in accordance with an illustrative embodiment. Set splitting process 600 can be implemented in a computer, such as, for example, computer 101 in FIG. 1 or computer 202 in FIG. 2.

In this example, the computer utilizes set splitter 602, such as, for example, set splitter 218 in FIG. 2, to split set of compatible concepts 604 into test set of concepts 606 and expected set of concepts 608. Set of compatible concepts 604 can be, for example, set of compatible concepts 408 in FIG. 4. Test set of concepts 606 and expected set of concepts 608 can be, for example, test set of concepts 220 and expected set of concepts 222 in FIG. 2.

It should be noted that set splitter 602 can utilize different splitting strategies and can repeat the splitting process for cross-validation. In one illustrative embodiment, set splitter 602 utilizes random sampling as the splitting strategy. For example, given the size of test set of concepts 606 as a fraction of the entire size of set of compatible concepts 604, this random sampling splitting strategy selects concepts at random from set of compatible concepts 604 and assigns these randomly selected concepts to test set of concepts 606. Set splitter 602 repeats this random concept selection process until the desired size of test set of concepts 606 is met. Set splitter 602 assigns the remaining concepts of set of compatible concepts 604 to expected set of concepts 608. It should be noted that set splitter 602 can utilize random sampling as a default splitting strategy.

In an alternative illustrative embodiment, set splitter 602 can utilize "most recently used concepts" of the set of compatible concepts as the splitting strategy. This particular strategy utilizes ordering among the concepts within set of compatible concepts 604 (e.g., the ordering among the concepts in set of compatible concepts 604 may be time-based, position-based, or the like). In yet another alternative illustrative embodiment, the splitting strategy can be any splitting strategy input by a user, such as, for example, domain expert 209 in FIG. 2.

Figure 7:
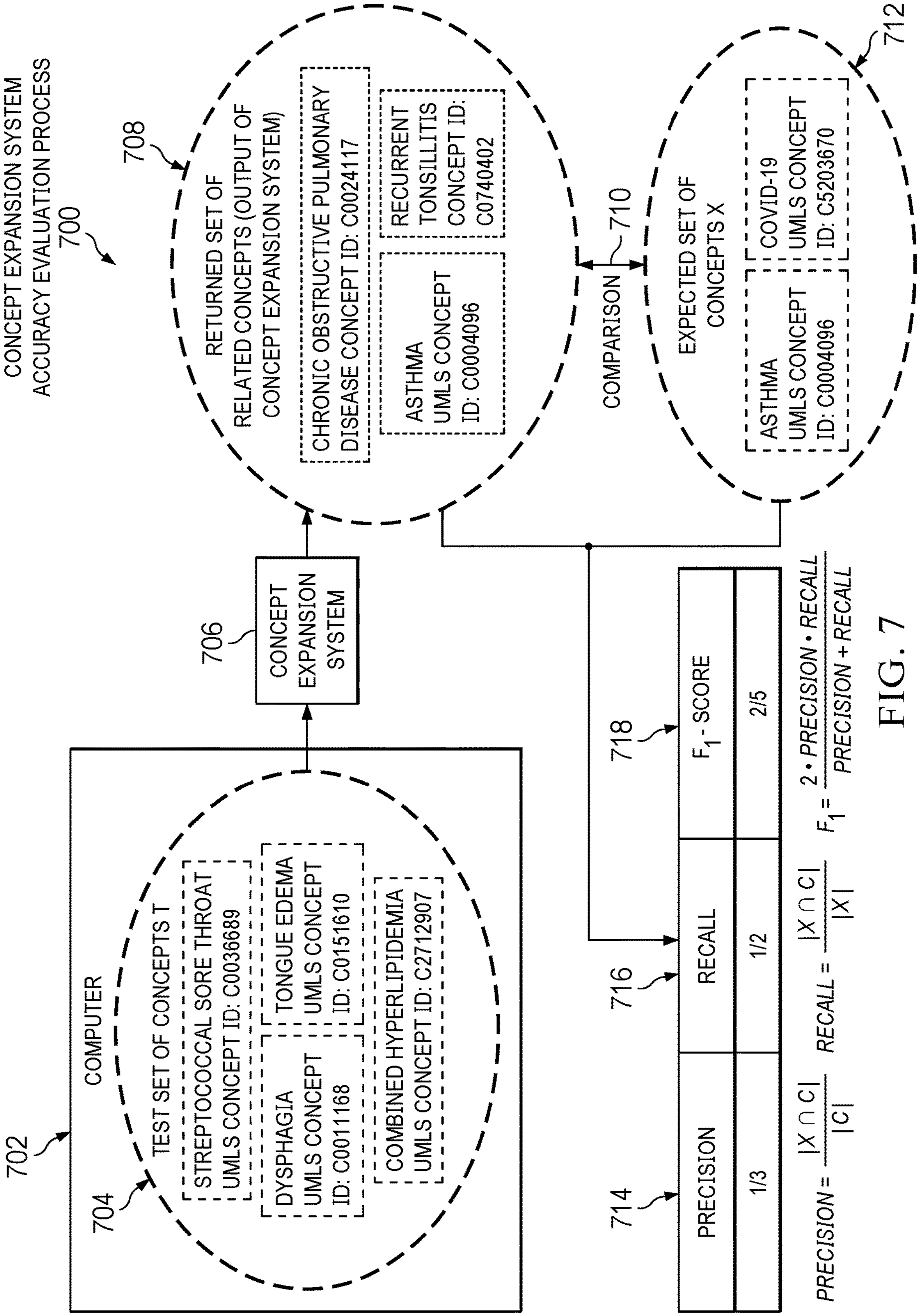
FIG. 7 is a diagram illustrating an example of a concept expansion system accuracy evaluation process in accordance with an illustrative embodiment.

With reference now to FIG. 7, a diagram illustrating an example of a concept expansion system accuracy evaluation process is depicted in accordance with an illustrative embodiment. Concept expansion system accuracy evaluation process 700 is implemented in computer 702, such as, for example, computer 101 in FIG. 1 or computer 202 in FIG. 2.

In this example, computer 702 inputs test set of concepts 704, such as, for example, test set of concepts 220 in FIG. 2 or test set of concepts 606 in FIG. 6, into concept expansion system 706. Concept expansion system 706 may be, for example, concept expansion system 204 in FIG. 2. In response to receiving test set of concepts 704, concept expansion system 706 outputs returned set of related concepts 708, which corresponds to test set of concepts 704. Upon receiving returned set of related concepts 708, computer 702 performs comparison 710 between returned set of related concepts 708 and expected set of concepts 712 to identify intersection between returned set of related concepts 708 and expected set of concepts 712. Expected set of concepts 712 can be, for example, expected set of concepts 222 in FIG. 2 or expected set of concepts 608 in FIG. 6.

Computer 702 generates a set of accuracy metrics, which includes at least one of precision 714, recall 716, or F1-score 718, based on the identified intersection between returned set of related concepts 708 and expected set of concepts 712 to evaluate the accuracy of concept expansion system 706. Computer 702 can utilize, for example, the following to calculate precision 714, recall 716, and F1-score 718:

$$\text{precision} = \frac{|X \cap C|}{|C|},$$

-continued $$\text{recall} = \frac{|X \cap C|}{|X|}, \text{ and}$$

$$F_1 = \frac{2 \cdot \text{precision} \cdot \textit{recal}}{\text{precision} + \text{recall}},$$

where "X" represents expected set of concepts 712 and "C" represents returned set of related concepts 708. In this example, computer 702 calculates precision 714 as $\frac{1}{3}$, recall 716 as $\frac{1}{2}$, and F1-score 718 as $\frac{2}{5}$.

Figure 8:
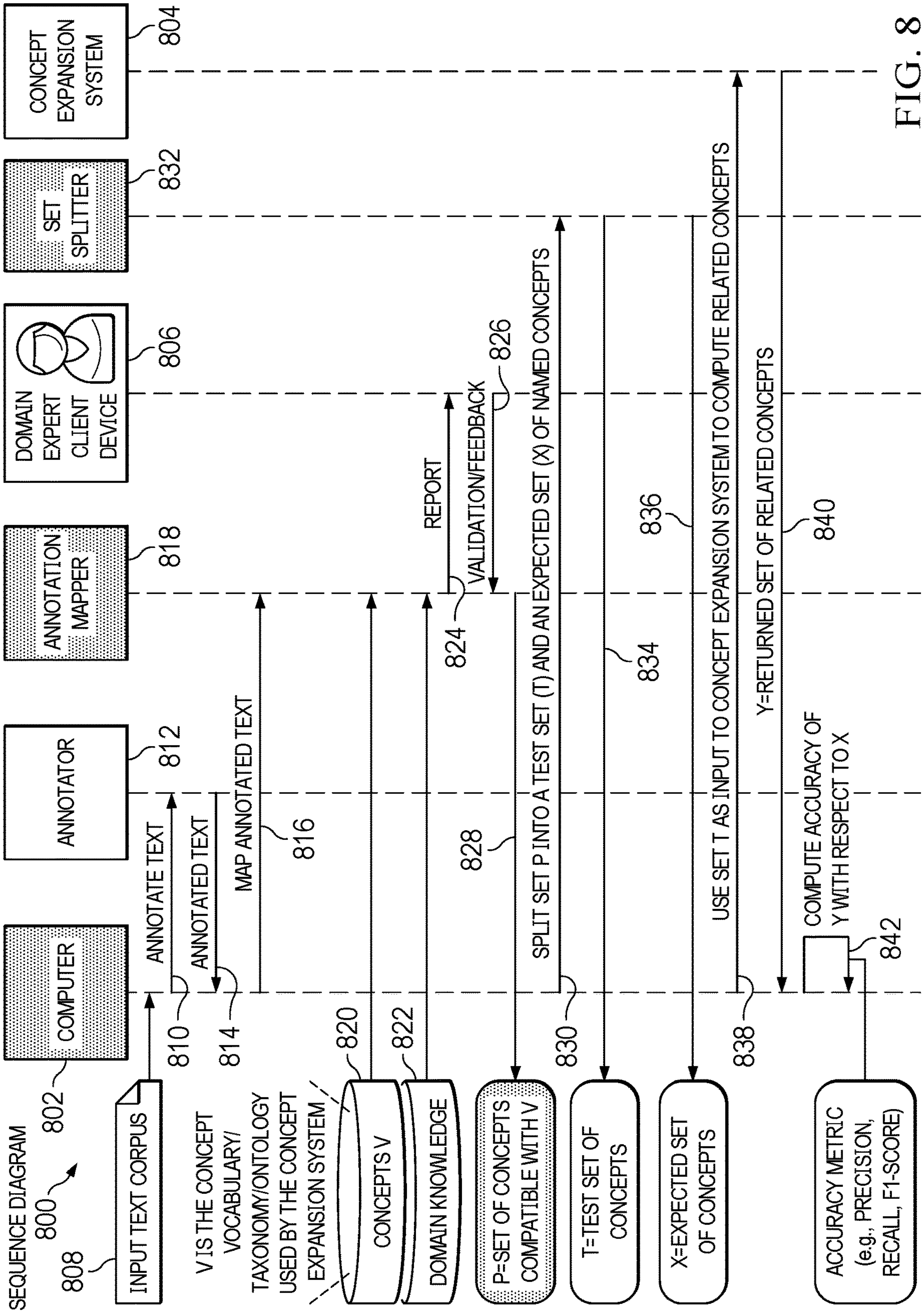
FIG. 8 illustrates an example of a sequence diagram in accordance with an illustrative embodiment.

With reference now to FIG. 8, an example of a sequence diagram is illustrated in accordance with an illustrative embodiment. Sequence diagram 800 can be implemented in a computing environment, such as, for example, computing environment 100 in FIG. 1. In this example, sequence diagram 800 includes computer 802, concept expansion system 804, and domain expert client device 806, such as, for example, computer 202, concept expansion system 204, and client device 206 in FIG. 2.

Sequence diagram 800 starts when computer 802 receives input text corpus 808, such as, for example, input text corpus 304 in FIG. 3 or input text corpus 504 in FIG. 5, from domain expert client device 806. At 810, computer utilizes annotator 812 to annotate input text corpus 808. At 814, annotator 812 returns annotated text to computer 802. At 816, computer 802 utilizes annotation mapper 818 to map the annotated text to concepts 820, which are used by concept expansion system 804, using domain knowledge 822. Based on the mapping between the annotated text and concepts 820, annotation mapper 818 generates a set of compatible concepts, which is compatible with concept expansion system 804 as input. The set of compatible concepts can be, for example, set of compatible concepts 408 in FIG. 4 or set of compatible concepts 604 in FIG. 6.

At 824, annotation mapper 818 generates a report regarding the set of compatible concepts and sends the report to domain expert client device 806. At 826, annotation mapper 818 receives validation/feedback regarding the set of compatible concepts from domain expert client device 806. At 828, annotation mapper 818 sends the set of compatible concepts that is compatible with concepts 820 used by concept expansion system 804.

At 830, computer 802 utilizes set splitter 832 to split the set of compatible concepts (P) into a test set of concepts (T) and an expected set of concepts (X). At 834, set splitter 832 returns the test set of concepts (T) to computer 802. At 836, set splitter 832 returns the expected set of concepts (X) to computer 802.

At 838, computer 802 uses the test set of concepts (T) as input to concept expansion system 804 to compute related concepts to test set of concepts (T). At 840, concept expansion system 804 outputs returned set of related concepts (Y) to computer 802. At 842, computer 802 computes the accuracy of the returned set of related concepts (Y) with regard to the expected set of concepts (X) using accuracy metrics, such as, for example, precision, recall, and F1-score.

Figure 9A:
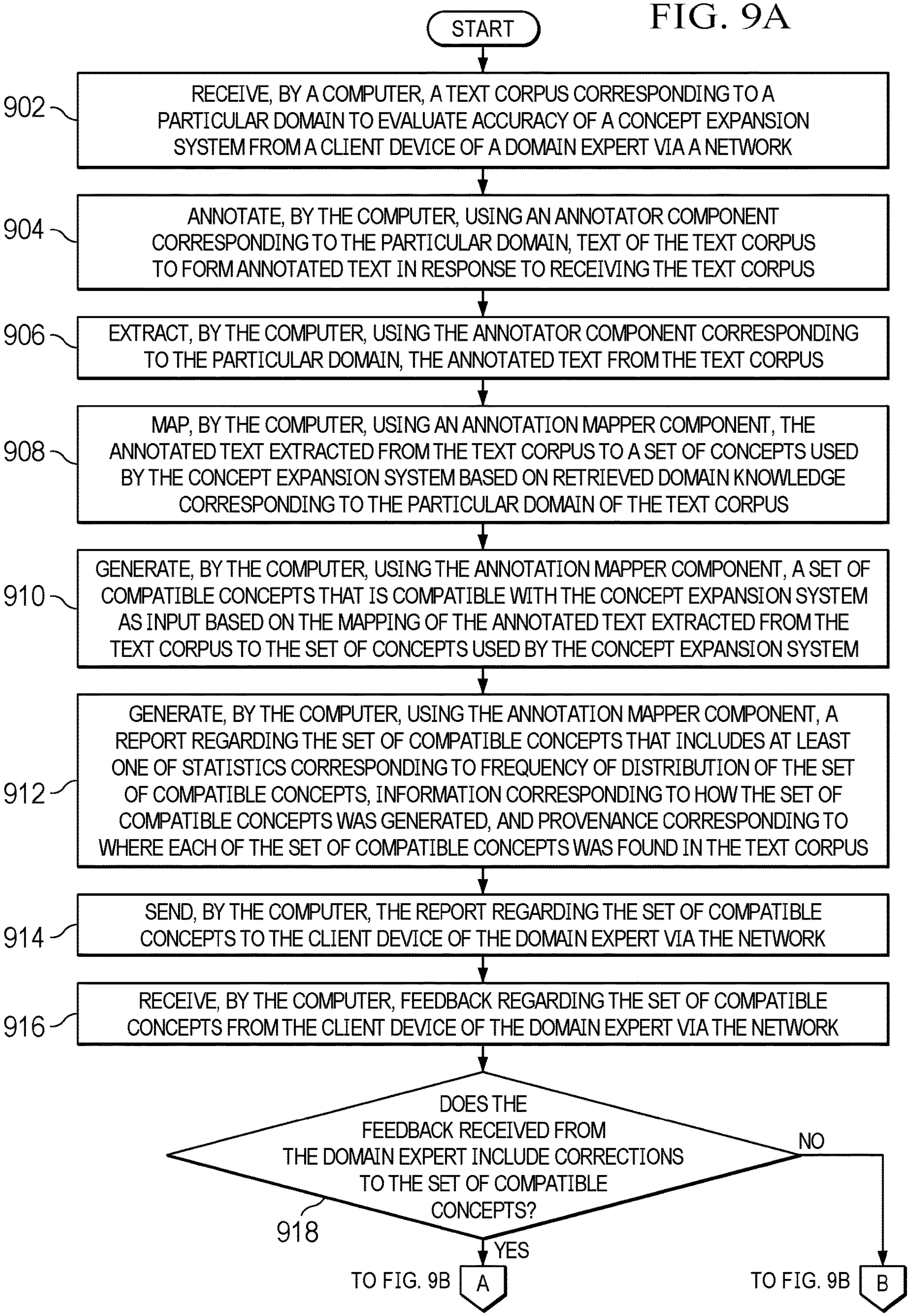
FIGS. 9A-9B are a flowchart illustrating a process for enhanced accuracy evaluation of concept expansion systems in accordance with an illustrative embodiment.
Figure 9B:
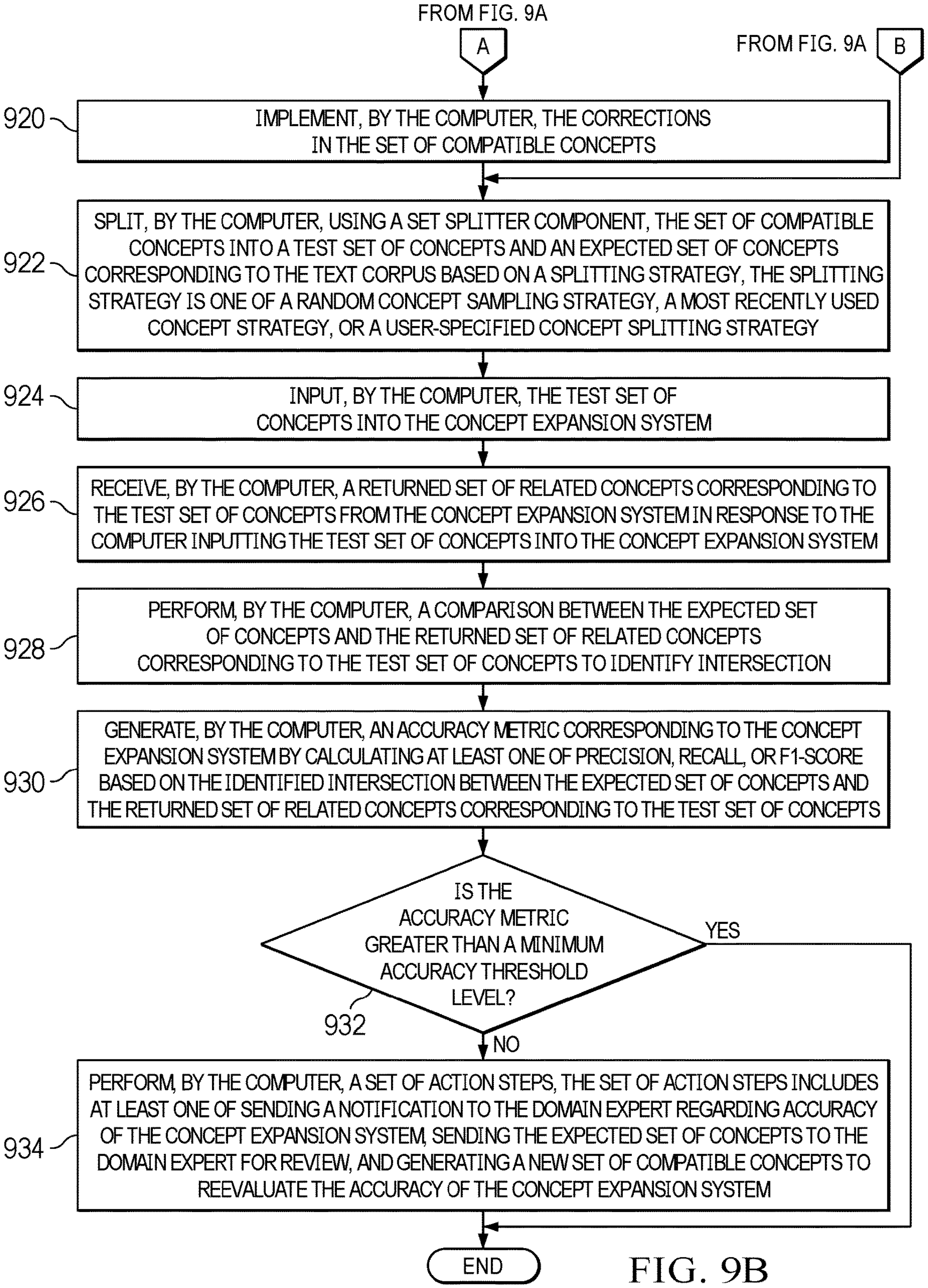

With reference now to FIGS. 9A-9B, a flowchart illustrating a process for enhanced accuracy evaluation of concept expansion systems is shown in accordance with an illustrative embodiment. The process shown in FIGS. 9A-9B may be implemented in a computer, such as, for example, computer 101 in FIG. 1 or computer 202 in FIG. 2. For example, the process shown in FIGS. 9A-9B may be implemented in concept expansion system accuracy evaluation code 200 in FIG. 1.

The process begins when the computer receives a text corpus corresponding to a particular domain to evaluate accuracy of a concept expansion system from a client device of a domain expert via a network (step 902). The computer, using an annotator component corresponding to the particular domain, annotates text of the text corpus to form annotated text in response to receiving the text corpus (step 904). The computer, using the annotator component corresponding to the particular domain, extracts the annotated text from the text corpus (step 906).

The computer, using an annotation mapper component, maps the annotated text extracted from the text corpus to a set of concepts used by the concept expansion system based on retrieved domain knowledge corresponding to the particular domain of the text corpus (step 908). The computer, using the annotation mapper component, generates a set of compatible concepts that is compatible with the concept expansion system as input based on the mapping of the annotated text extracted from the text corpus to the set of concepts used by the concept expansion system (step 910).

The computer, using the annotation mapper component, generates a report regarding the set of compatible concepts that includes at least one of statistics corresponding to frequency of distribution of the set of compatible concepts, information corresponding to how the set of compatible concepts was generated, and provenance corresponding to where each of the set of compatible concepts was found in the text corpus (step 912). The computer sends the report regarding the set of compatible concepts to the client device of the domain expert via the network (step 914). Subsequently, the computer receives feedback regarding the set of compatible concepts from the client device of the domain expert via the network (step 916).

The computer makes a determination as to whether the feedback received from the domain expert includes corrections to the set of compatible concepts (step 918). If the computer determines that the feedback received from the domain expert does not include corrections to the set of compatible concepts (e.g., validation of the set of compatible concepts), no output of step 918, then the process proceeds to step 922. If the computer determines that the feedback received from the domain expert does include corrections to the set of compatible concepts, yes output of step 918, then the computer implements the corrections in the set of compatible concepts (step 920).

Afterward, the computer, using a set splitter component, splits the set of compatible concepts into a test set of concepts and an expected set of concepts corresponding to the text corpus based on a splitting strategy (step 922). The splitting strategy is one of a random concept sampling strategy, a most recently used concept strategy, or a user-specified concept splitting strategy. The computer inputs the test set of concepts into the concept expansion system (step 924).

Subsequently, the computer receives a returned set of related concepts corresponding to the test set of concepts from the concept expansion system in response to the computer inputting the test set of concepts into the concept expansion system (step 926). The computer performs a comparison between the expected set of concepts and the returned set of related concepts corresponding to the test set of concepts to identify intersection (step 928). The computer generates an accuracy metric corresponding to the concept expansion system by calculating at least one of precision, recall, or F1-score based on the identified intersection between the expected set of concepts and the returned set of related concepts corresponding to the test set of concepts (step 930).

Afterward, the computer makes a determination as to whether the accuracy metric is greater than a minimum accuracy threshold level (step 932). If the computer determines that the accuracy metric is greater than the minimum accuracy threshold level, yes output of step 932, then the process terminates thereafter. If the computer determines that the accuracy metric is not greater than the minimum accuracy threshold level, no output of step 932, then the computer performs a set of action steps (step 934). The set of action steps includes at least one of sending a notification to the domain expert regarding accuracy of the concept expansion system, sending the expected set of concepts to the domain expert for review, and generating a new set of compatible concepts to reevaluate the accuracy of the concept expansion system. Thereafter, the process terminates.

Thus, illustrative embodiments of the present disclosure provide a computer-implemented method, computer system, and computer program product for enhanced accuracy evaluation of concept expansion systems. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for accuracy evaluation of a concept expansion system, the computer-implemented method comprising:

receiving, by a computer, a text corpus that includes a set of books corresponding to a domain to evaluate accuracy of the concept expansion system;

training, by the computer, an annotator using the text corpus that includes the set of books corresponding to the domain to form a trained annotator corresponding to the domain;

annotating, by the computer, using the trained annotator corresponding to the domain, text of the text corpus that includes the set of books corresponding to the domain to form annotated text;

extracting, by the computer, using the trained annotator corresponding to the domain, the annotated text from the text corpus that includes the set of books corresponding to the domain;

storing, by the computer, the annotated text in a trie data structure to increase mapping efficiency of the computer;

querying, by the computer, the concept expansion system to reconstruct a set of concepts used by the concept expansion system;

mapping, by the computer, the annotated text stored in the trie data structure to the set of concepts used by the concept expansion system;

generating, by the computer, a set of compatible concepts that is compatible with the concept expansion system based on the mapping of the annotated text stored in the trie data structure to the set of concepts used by the concept expansion system;

receiving, by the computer, a returned set of related concepts corresponding to a test set of concepts from the concept expansion system;

performing, by the computer, a comparison between an expected set of concepts and the returned set of related concepts corresponding to the test set of concepts to identify intersection;

generating, by the computer, an accuracy metric corresponding to the concept expansion system based on the intersection between the expected set of concepts and the returned set of related concepts corresponding to the test set of concepts;

determining, by the computer, whether the accuracy metric is greater than a minimum accuracy threshold level; and performing, by the computer, a set of action steps in response to the computer determining that the accuracy metric is not greater than the minimum accuracy threshold level.

2. The computer-implemented method of claim 1, wherein an annotation mapper maps the annotated text to the set of concepts used by the concept expansion system based on the trie data structure.

3. The computer-implemented method of claim 1, further comprising:

generating, by the computer, using an annotation mapper, a report regarding the set of compatible concepts that includes at least one of statistics corresponding to frequency of distribution of the set of compatible concepts, information corresponding to how the set of compatible concepts was generated, and provenance corresponding to where each of the set of compatible concepts was found in the text corpus;

sending, by the computer, the report regarding the set of compatible concepts to a domain expert; and receiving, by the computer, feedback regarding the set of compatible concepts from the domain expert.

4. The computer-implemented method of claim 3, further comprising:

determining, by the computer, whether the feedback includes corrections to the set of compatible concepts; and implementing, by the computer, the corrections in the set of compatible concepts in response to the computer determining that the feedback does include corrections to the set of compatible concepts.

5. The computer-implemented method of claim 4, further comprising:

splitting, by the computer, using a set splitter, the set of compatible concepts into the test set of concepts and the expected set of concepts corresponding to the text corpus based on a splitting strategy; and inputting, by the computer, the test set of concepts into the concept expansion system.

6. The computer-implemented method of claim 5, wherein the splitting strategy is one of a random concept sampling strategy, a most recently used concept strategy, or a user-specified concept splitting strategy.

7. The computer-implemented method of claim 1, wherein the computer generates the accuracy metric corresponding to the concept expansion system by calculating at least one of precision, recall, or F1-score.

8. The computer-implemented method of claim 1, wherein the set of action steps includes at least one of sending a notification to a domain expert regarding accuracy of the concept expansion system, sending the expected set of concepts to the domain expert for review, and generating a new set of compatible concepts to reevaluate the accuracy of the concept expansion system.

9. A computer system for accuracy evaluation of a concept expansion system, the computer system comprising:

a communication fabric;

a storage device connected to the communication fabric, wherein the storage device stores program instructions; and a processor connected to the communication fabric, wherein the processor executes the program instructions to:

receive a text corpus that includes a set of books corresponding to a domain to evaluate accuracy of the concept expansion system;

train an annotator using the text corpus that includes the set of books corresponding to the domain to form a trained annotator corresponding to the domain;

annotate, using the trained annotator corresponding to the domain, text of the text corpus that includes the set of books corresponding to the domain to form annotated text;

extract, using the trained annotator corresponding to the domain, the annotated text from the text corpus that includes the set of books corresponding to the domain;

store the annotated text in a trie data structure to increase mapping efficiency of the computer system;

query the concept expansion system to reconstruct a set of concepts used by the concept expansion system;

map the annotated text stored in the trie data structure to the set of concepts used by the concept expansion system;

generate a set of compatible concepts that is compatible with the concept expansion system based on the mapping of the annotated text stored in the trie data structure to the set of concepts used by the concept expansion system;

receive a returned set of related concepts corresponding to a test set of concepts from the concept expansion system;

perform a comparison between an expected set of concepts and the returned set of related concepts corresponding to the test set of concepts to identify intersection;

generate an accuracy metric corresponding to the concept expansion system based on the intersection between the expected set of concepts and the returned set of related concepts corresponding to the test set of concepts;

determine whether the accuracy metric is greater than a minimum accuracy threshold level; and perform a set of action steps in response to determining that the accuracy metric is not greater than the minimum accuracy threshold level.

10. A computer program product for accuracy evaluation of a concept expansion system, the computer program product comprising a computer-readable storage medium having program instructions embodied therewith, the program instructions executable by a computer to cause the computer to:

receive a text corpus that includes a set of books corresponding to a domain to evaluate accuracy of the concept expansion system;

train an annotator using the text corpus that includes the set of books corresponding to the domain to form a trained annotator corresponding to the domain;

annotate, using the trained annotator corresponding to the domain, text of the text corpus that includes the set of books corresponding to the domain to form annotated text;

extract, using the trained annotator corresponding to the domain, the annotated text from the text corpus that includes the set of books corresponding to the domain;

store the annotated text in a trie data structure to increase mapping efficiency of the computer;

query the concept expansion system to reconstruct a set of concepts used by the concept expansion system;

map the annotated text stored in the trie data structure to the set of concepts used by the concept expansion system;

generate a set of compatible concepts that is compatible with the concept expansion system based on the mapping of the annotated text stored in the trie data structure to the set of concepts used by the concept expansion system;

receive a returned set of related concepts corresponding to a test set of concepts from the concept expansion system;

perform a comparison between an expected set of concepts and the returned set of related concepts corresponding to the test set of concepts to identify intersection;

generate an accuracy metric corresponding to the concept expansion system based on the intersection between the expected set of concepts and the returned set of related concepts corresponding to the test set of concepts;

determine whether the accuracy metric is greater than a minimum accuracy threshold level; and perform a set of action steps in response to determining that the accuracy metric is not greater than the minimum accuracy threshold level.

11. The computer program product of claim 10, wherein an annotation mapper maps the annotated text to the set of concepts used by the concept expansion system based on the trie data structure.

12. The computer program product of claim 10, wherein the program instructions further cause the computer to:

generate, using an annotation mapper, a report regarding the set of compatible concepts that includes at least one of statistics corresponding to frequency of distribution of the set of compatible concepts, information corresponding to how the set of compatible concepts was generated, and provenance corresponding to where each of the set of compatible concepts was found in the text corpus;

send the report regarding the set of compatible concepts to a domain expert; and receive feedback regarding the set of compatible concepts from the domain expert.

13. The computer program product of claim 12, wherein the program instructions further cause the computer to:

determine whether the feedback includes corrections to the set of compatible concepts; and implement the corrections in the set of compatible concepts in response to the computer determining that the feedback does include corrections to the set of compatible concepts.

14. The computer program product of claim 13, wherein the program instructions further cause the computer to:

split, using a set splitter, the set of compatible concepts into the test set of concepts and the expected set of concepts corresponding to the text corpus based on a splitting strategy; and input the test set of concepts into the concept expansion system.

* * * * *